(12) United States Patent
Sakai et al.

(10) Patent No.: US 12,258,706 B2
(45) Date of Patent: Mar. 25, 2025

(54) CARPET

(71) Applicant: TORAY Industries, Inc., Tokyo (JP)

(72) Inventors: Kenichi Sakai, Otsu (JP); Hiroshi Kajiyama, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 658 days.

(21) Appl. No.: 17/295,204

(22) PCT Filed: Nov. 26, 2019

(86) PCT No.: PCT/JP2019/046050
§ 371 (c)(1),
(2) Date: May 19, 2021

(87) PCT Pub. No.: WO2020/111019
PCT Pub. Date: Jun. 4, 2020

(65) Prior Publication Data
US 2022/0010486 A1 Jan. 13, 2022

(30) Foreign Application Priority Data
Nov. 27, 2018 (JP) .................................. 2018-220983

(51) Int. Cl.
*D06N 7/00* (2006.01)
*D02G 3/44* (2006.01)
*D06M 15/277* (2006.01)
*D06M 15/643* (2006.01)

(52) U.S. Cl.
CPC ........... *D06N 7/0065* (2013.01); *D02G 3/445* (2013.01); *D06M 15/277* (2013.01); *D06M 15/643* (2013.01); *D06N 7/0039* (2013.01)

(58) Field of Classification Search
CPC .... D06N 7/0065; D06N 7/0039; D02G 3/445; D06M 15/277; D06M 15/643
See application file for complete search history.

(56) References Cited

U.S. PATENT DOCUMENTS 5,442,011 A * 8/1995 Halling ............... C04B 41/4961
556/424

FOREIGN PATENT DOCUMENTS

| CN | 106637471 A | | 5/2017 |
|---|---|---|---|
| JP | 9-67774 A | | 3/1997 |
| JP | 2000119971 | * | 4/2000 |
| JP | 2002-523645 A | | 7/2002 |
| JP | 2003-265301 A | | 9/2003 |
| JP | 3629871 | * | 3/2005 |
| JP | 2006-503196 A | | 1/2006 |
| JP | 4515912 B2 | | 8/2010 |
| JP | 2012-503031 A | | 2/2012 |
| JP | 2014167183 | * | 9/2014 |
| JP | 2016-73374 A | | 5/2016 |
| JP | 2018-71023 A | | 5/2018 |
| WO | WO 00/12789 A1 | | 3/2000 |
| WO | WO 02/02862 A2 | | 1/2002 |
| WO | WO 2004/035908 A2 | | 4/2004 |
| WO | WO 2010/030042 A1 | | 3/2010 |

OTHER PUBLICATIONS

English translation of Japanese Office Action for Japanese Application No. 2020-557714, dated Sep. 12, 2023.
International Search Report, issued in PCT/JP2019/046050, dated Feb. 18, 2020.
Written Opinion of the International Searching Authority, issued in PCT/JP2019/046050, dated Feb. 18, 2020.
Chinese Office Action and Search Report for Chinese Application No. 201980076565.9, dated Feb. 14, 2022, with English translation of the Office Action.
Extended European Search Report for European Application No. 19888631.9, dated Aug. 2, 2022.
Canadian Office Action and Search Report for Canadian Application No. PCT/JP2019/046050, dated Dec. 5, 2024.

* cited by examiner

*Primary Examiner* — Amina S Khan
(74) *Attorney, Agent, or Firm* — Birch, Stewart, Kolasch & Birch, LLP

(57) ABSTRACT

An object of the present invention is to provide a carpet exhibiting excellent antifouling property against both dry soil and wet soil. The carpet is a carpet including a pile yarn having a coated pile single yarn, in which the coated pile single yarn is a pile single yarn to which a layer A containing organopolysiloxane and a fluorine-based compound is attached, a fineness of the coated pile single yarn is 8 to 40 dtex, a crimp elongation of the pile yarn is 10% to 30%, a carpet staining degree (ΔE) in an antifouling dry test is 30 or less, and a carpet staining degree (ΔE) in an antifouling wet test is 30 or less.

5 Claims, 3 Drawing Sheets

CARPET

TECHNICAL FIELD

The present invention relates to a carpet.

BACKGROUND ART

Carpets are widely used in offices, hotels, restaurants, public facilities, homes, entrances to buildings, and motor vehicles but have a problem that dirt adheres to the carpet and the appearance is impaired as the carpet is used. Hence, it has been conventionally studied to impart antifouling properties to carpets in order to prevent carpets from getting dirty.

Here, as a technology for imparting antifouling properties against dry soil and wet soil to carpets, a method is known in which a composition containing organopolysiloxane, a fluororesin, and an acid that makes the pH of the composition acidic are attached to the surfaces of pile yarns constituting the carpet (see Patent Document 1). The kinds of antifouling properties of these carpets are as follows. Antifouling properties against dry soil immediately after the start of use (hereinafter, referred to as dry initial antifouling property in some cases). Antifouling properties against wet soil immediately after the start of use of carpet (hereinafter, referred to as wet initial antifouling property in some cases). This wet initial antifouling property is a property that is improved by improvement in a water-repellent property of pile yarn. The method disclosed in Patent Document 1 provides antifouling properties superior to the dry initial antifouling property and the wet initial antifouling property of a carpet composed of pile yarns in which organopolysiloxane and fluororesin are not supported on the surfaces.

PRIOR ART DOCUMENTS

Patent Documents

Patent Document 1: International Publication No. 2004-035908

SUMMARY OF THE INVENTION

Problems to be Solved by the Invention

As described above, the dry initial antifouling property and the wet initial antifouling property of a carpet described in Patent Document 1 are excellent. However, according to the findings by the inventors, there is a problem that the antifouling performance against dry soil and the antifouling performance against wet soil significantly decrease in a case in which this carpet is used as a carpet that is supposed to be used in a dirty environment such as a tile carpet that is often trampled by outdoor shoes.

Hence, in view of the above problems, an object of the present invention is to provide a carpet excellent in the dry initial antifouling property and the wet initial antifouling property and further excellent in properties of suppressing a decrease in the antifouling property against dry soil (hereinafter, referred to as dry antifouling durability in some cases) and properties of suppressing a decrease in the antifouling property against wet soil (hereinafter, referred to as wet antifouling durability in some cases).

Solutions to the Problems

In order to solve the above problems, the carpet of the present invention is as follows.

(1) The carpet of the present invention is a carpet including a pile yarn having a coated pile single yarn, in which
the coated pile single yarn is a pile single yarn to which a layer A containing organopolysiloxane and a fluorine-based compound is attached,
a fineness of the coated pile single yarn is 8 to 40 dtex,
a crimp elongation of the pile yarn is 10% to 30%,
a carpet staining degree (ΔE) in an antifouling dry test is 30 or less, and
a carpet staining degree (ΔE) in an antifouling wet test is 30 or less.

(2) The carpet of the present invention is preferably the carpet according to (1), in which a degree of deformation of the coated pile single yarn is 1.1 to 5.0.

(3) The carpet of the present invention is preferably the carpet according to (1) or (2), in which the fluorine-based compound has a siloxane bond.

The method for manufacturing a carpet of the present invention is as follows.

(4) The method for manufacturing a carpet of the present invention is preferably a method for manufacturing the carpet according to any one of (1) to (3), which includes:
a step of obtaining a carpet layer including a pile yarn having a pile single yarn and a primary base fabric; and
a step of impregnating the carpet layer with a solution containing organopolysiloxane and a fluorine-based compound
in this order.

Effects of the Invention

According to the present invention, it is possible to provide a carpet excellent in the dry initial antifouling property and the wet initial antifouling property and further excellent in a dry antifouling durability and a wet antifouling durability.

EMBODIMENTS OF THE INVENTION

Figure 1:
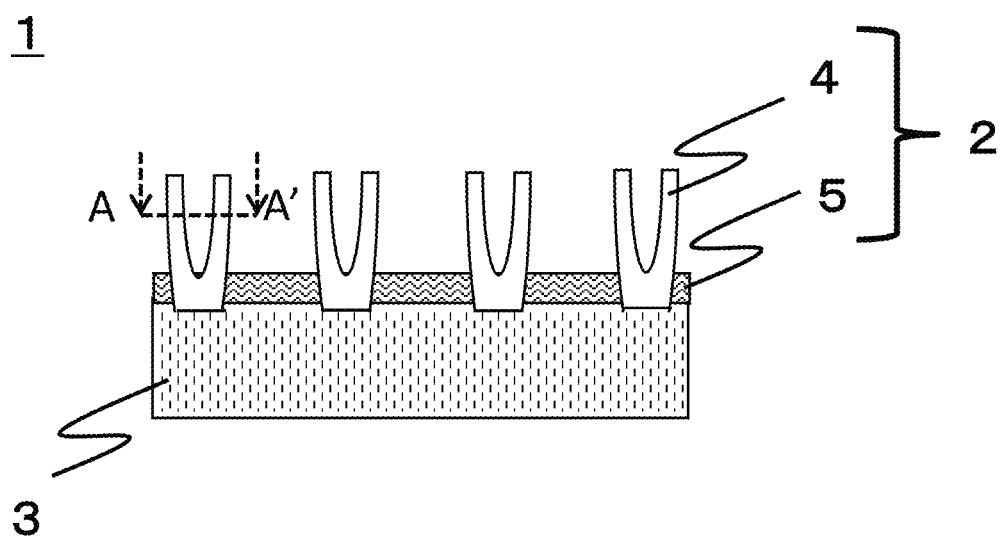
FIG. 1 is a cross-sectional conceptual view of an embodiment of a carpet of the present invention.

Hereinafter, actual forms of the present invention will be described in detail.

The carpet of the present invention includes a pile yarn, and the pile single yarn constituting the pile yarn has a layer A containing organopolysiloxane and a fluorine-based compound attached thereto. In the carpet of the present invention, the fineness of the coated pile single yarn (hereinafter, referred to as single yarn fineness in some cases) is 8 to 40 dtex, the crimp elongation of the pile yarn is 10% to 30%, the carpet staining degree (ΔE) in the antifouling dry test is 30 or less, and the carpet staining degree (ΔE) in the antifouling wet test is 30 or less. The carpet of the present invention, which satisfies all of these conditions, is excellent in a dry initial antifouling property and a wet initial antifouling property and further excellent in a dry antifouling durability and a wet antifouling durability.

First, the mechanism by which the dry initial antifouling property and the wet initial antifouling property of the carpet of the present invention are excellent is presumed as follows. In other words, the size of voids existing in the pile yarn becomes a proper size since the fineness of the coated pile single yarns included in the carpet of the present invention is 8 to 40 dtex, and further the size of the space existing between the pile yarns becomes a proper size since the crimp elongation of the pile yarns included in the carpet of the present invention is 10% to 30%. It is presumed that in addition to the features, since the coated pile single yarns constituting this pile yarn have a layer A containing organopolysiloxane and a fluorine-based compound, an environment is realized in which dust such as dry soil and wet soil that have entered the voids existing in the pile yarns and the spaces existing between the pile yarns can easily escape from these voids and spaces, and as a result, the dry initial antifouling property and the wet initial antifouling property of the carpet of the present invention become excellent.

Next, the mechanism by which the dry antifouling durability and the wet antifouling durability of the carpet of the present invention are excellent is presumed as follows. In other words, since the fineness of the coated pile single yarn is 8 to 40 dtex and the crimp elongation of the pile yarn is 10% to 30%, the pile yarn becomes bulky and the pile yarn is less likely to lose strength. In other words, the durability of the pile yarn against a wear stress is excellent. As a result, it is presumed that detachment of the layer A containing organopolysiloxane and a fluorine-based compound from the pile yarn due to a physical wear stress such as repeated trampling by outdoor shoes is suppressed and this significantly improves the dry antifouling durability and the wet antifouling durability of the carpet.

The carpet of the present invention having the configuration has a carpet staining degree ($\Delta E$) of 30 or less in the antifouling dry test and a carpet staining degree ($\Delta E$) of 30 or less in the antifouling wet test in the carpet staining degree ($\Delta E$) measured based on the antifouling test method described in the section of Examples. In other words, it can be said that the carpet of the present invention is excellent particularly in both of the antifouling properties against dirt such as dried dust that is called dry soil, dust, darkening and the antifouling properties against dirt such as mud that contains moisture in dry soil and is called wet soil. Such a carpet is suitably used as a tile carpet and the like used in an environment where the carpets are trampled by outdoor shoes. The carpet staining degree ($\Delta E$) in the antifouling dry test is more preferably 15 or less, still more preferably 10 or less. The carpet staining degree ($\Delta E$) in the antifouling wet test is more preferably 20 or less, still more preferably 15 or less. Examples of a means for obtaining such a carpet include using the material described in Example 1 or the like and adopting the manufacturing method described in Example 1.

Next, an embodiment of the carpet of the present invention will be described with reference to FIG. 1. This carpet 1 has a carpet layer 2 and a lining layer 3, and the carpet layer 2 has a pile yarn 4 and a primary base fabric 5. In the carpet layer, the pile yarn is driven into the primary base fabric 5 and forms a pile layer (not illustrated) in a state of standing up against the surface of the primary base fabric. FIG. 2 illustrates a cross-sectional conceptual view of the A-A' cross section of the carpet of the present invention illustrated in FIG. 1 and illustrates that the pile yarn 4 is an aggregate of a plurality of coated pile single yarns 6.

In the coated pile single yarn included in the carpet of the present invention, a layer A containing organopolysiloxane and a fluorine-based compound is attached to the surface of the pile single yarn. The initial antifouling property of the carpet of the present invention is excellent as these materials are attached. For the reason that the antifouling properties of the carpet of the present invention against both dry soil and wet soil are superior, the ratio (hereinafter, simply referred to as the attachment area ratio in the coated pile single yarns) of the surface area of the pile single yarn to which the layer A containing organopolysiloxane and a fluorine-based compound is attached to the entire surface area of the pile single yarn is preferably 20% or more. Here, the attachment area ratio in the coated pile single yarn means one measured by the method described in the section of Examples. For the above reason, the attachment area ratio in the coated pile single yarn is more preferably 25% or more, still more preferably 30% or more, and it is particularly preferable that the entire surface of the pile single yarn be coated with the layer A containing organopolysiloxane and a fluorine-based compound.

Figure 4:
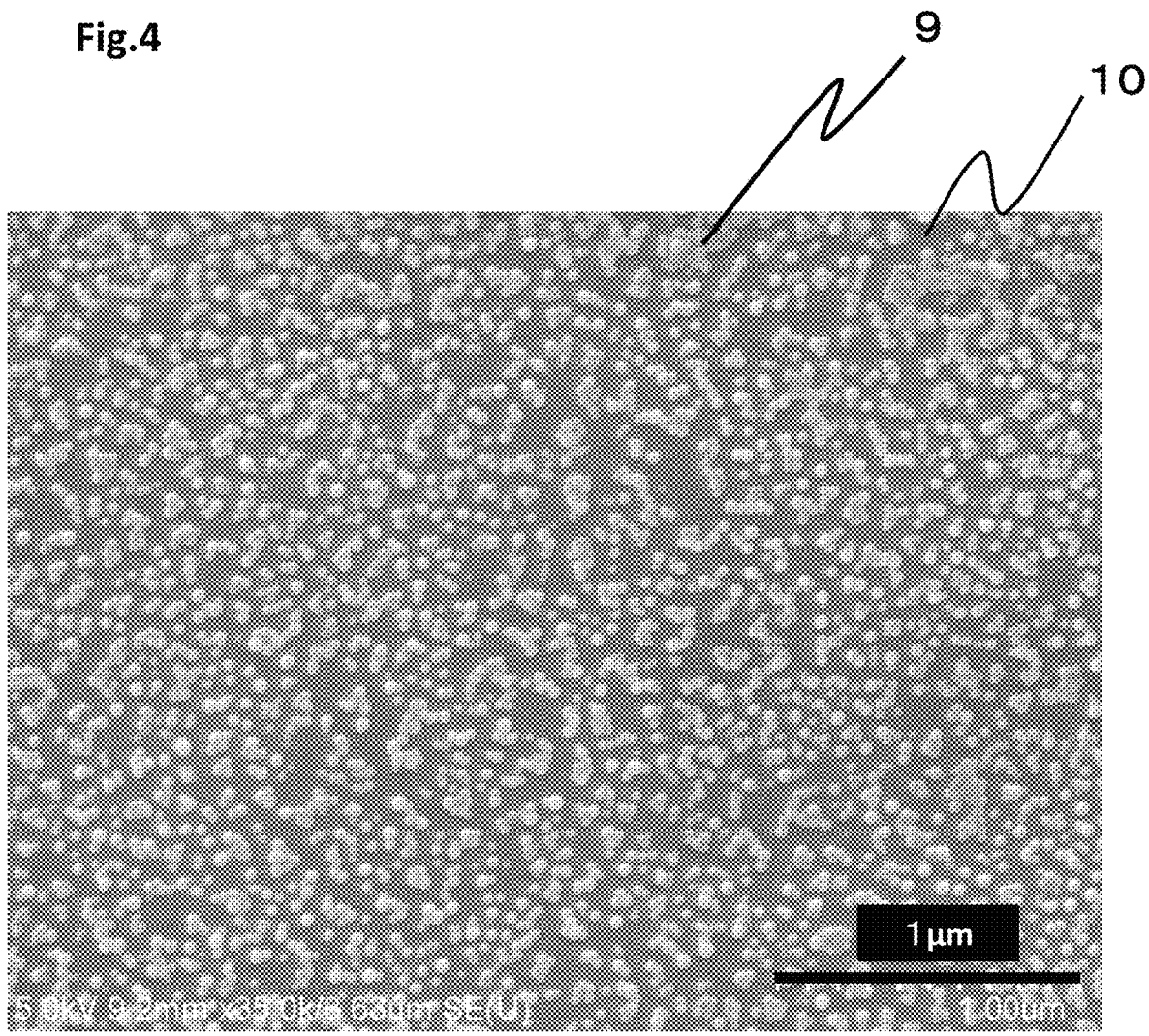
FIG. 4 is a surface SEM image of a coated pile single yarn in an embodiment of a carpet of the present invention.

FIG. 4 illustrates a surface SEM image of the coated pile single yarn in an embodiment of the carpet of the present invention. In this SEM image, the layer A (indicated by reference numeral 9 in FIG. 4) containing organopolysiloxane and a fluorine-based compound and a surface 10 of the pile single yarn that is not coated with the layer A but is exposed are observed on the surface of the coated pile yarn. The coating area of this coated pile single yarn in the coated pile single yarn is 31%.

Figure 2:
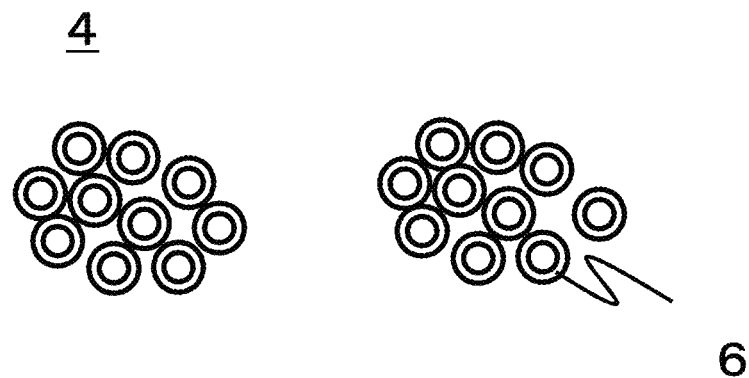
FIG. 2 is a cross-sectional conceptual view of the A-A' cross section of the carpet of the present invention illustrated in FIG. 1.
Figure 3:
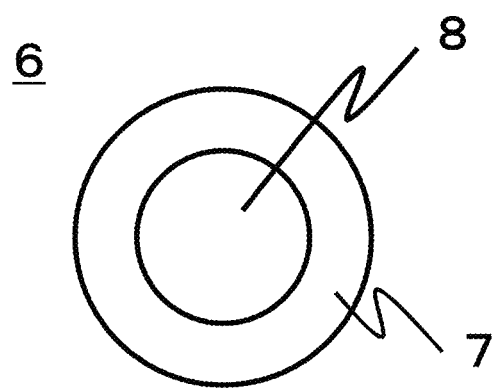
FIG. 3 is a cross-sectional conceptual view of a coated pile single yarn included in the carpet of the present invention illustrated in FIG. 1.

Here, FIG. 3 illustrates the cross-sectional conceptual view of the coated pile single yarn included in the carpet of the present invention illustrated in FIG. 1 and illustrates that the coated pile single yarn 6 is composed of a layer A (indicated by reference numeral 7 in FIG. 3) containing organopolysiloxane and a fluorine-based compound and a pile single yarn 8 coated with this layer A containing organopolysiloxane and a fluorine-based compound.

Examples of the organopolysiloxane that can be used in the carpet of the present invention include a polymer compound having a skeleton by a siloxane bond (Si—O—Si bond) in the main chain and various organic groups in the side chain. Specific examples thereof include organosilicone having an alkyl group in the side chain and an organosilicate having an alkoxy group in the side chain. The side chains and ends in the chemical structures of these compounds may be substituted with various modifying groups. Here, for the reason that the layer A containing organopolysiloxane and a fluorine-based compound can be prevented from falling off from the pile yarn, the organopolysiloxane is preferably a cation-modified organosilicate. As the organopolysiloxane, specifically a model number: Silicon SC9450N manufactured by Shin-Etsu Chemical Co., Ltd., a model number: POLONMK-206 manufactured by Shin-Etsu Chemical Co., Ltd., a model number: TSG-808 manufactured by TAKAMATSU OIL & FAT CO., LTD., a model number: PSA6574 manufactured by General Electric Company, and the like can be used.

A cation-modified organosilicate can be produced by treating silica with an organic compound having both a cationic group such as a primary to tertiary amino group or a quaternary ammonium group and a functional group exhibiting reactivity with a silanol group. Examples of the organic compound having both a cationic group such as a primary to tertiary amino group or a quaternary ammonium group and a functional group exhibiting reactivity with a silanol group include aminoethoxysilane and aminoalkyldiglycidyl ether.

Examples of the fluorine-based compound that can be used in the carpet of the present invention include a compound containing any perfluoroalkyl group having 1 to 6 carbon atoms. More preferably, the fluorine-based compound is a compound having a perfluoroalkyl group having 6 carbon atoms. Here, examples of the compound having perfluoroalkyl group include an acrylic acid ester having a perfluoroalkyl group and methacrylic acid ester having a perfluoroalkyl group. As the fluorine compound, specifically NK Guard S-2020 manufactured by NICCA CHEMICAL CO., LTD., S-1130 manufactured by NICCA CHEMICAL CO., LTD., "Fluorolink" (registered trademark) P56 manufactured by Solvay, TK Guard C-654 manufactured by TAKAMATSU OIL & FAT CO., LTD., and the like can be used. Here, for the reason that the adhesion of wet soil to the pile yarn and the carpet can be further suppressed, the compound having a perfluoroalkyl group is preferably nonionic.

The fluorine-based compound of the present invention preferably has a siloxane bond. As the fluorine-based compound has a siloxane bond, the compatibility with polyorganosiloxane is improved and the antifouling properties (a concept including the initial antifouling property) of the carpet against dry soil and wet soil become superior. In the present invention, a compound having a siloxane bond containing a fluorine atom is classified as a fluorine-based compound.

In the present invention, the method for providing the layer A containing organopolysiloxane and a fluorine-based compound on the surface of the pile single yarn is not particularly limited, and the methods exemplified below can be used. Examples thereof include a method in which a treatment liquid containing organopolysiloxane and a fluorine-based compound is applied to a group of pile single yarns and then subjected to a heat treatment to be fixed to the pile yarns. Here, the means for applying the treatment liquid containing organopolysiloxane and a fluorine-based compound to pile single yarns is not particularly limited. Examples thereof include an impregnation method, a spraying method, or a roll coating method. Here, for the reason of uniformly fixing to the surface of the pile single yarn and the reason of exerting the antifouling properties in the entire carpet layer which includes a pile yarn and a primary base fabric, the means is preferably a method for manufacturing a carpet, which includes a step of obtaining a carpet layer including a pile yarn having a pile single yarn and a primary base fabric and a step of impregnating the carpet layer with a solution containing organopolysiloxane and a fluorine-based compound in this order. Examples of the method for squeezing the treatment liquid in the case of an impregnation method include a roll nip method and a vacuum method. A vacuum method is preferable particularly for the reason that the treatment liquid can be uniformly fixed to the surface of pile single yarns even for a carpet having a high basis weight or a carpet having a long pile length.

The heat treatment temperature is preferably 100° C. to 210° C. By setting the heat treatment temperature to 100° C. or more, the fixing strength between the organopolysiloxane and fluorine-based compound and the pile single yarn is improved and the antifouling durability of the carpet against a wear stress become superior. Meanwhile, by setting the heat treatment temperature to 210° C. or less, the occurrence of yellowing and embrittlement of the pile yarns is suppressed and decreases in the quality and durability of the pile yarns constituting the carpet are suppressed. More preferably, the lower limit of the heat treatment temperature is 120° C. or more and the upper limit is 180° C. or less.

Next, the pile yarn included in the carpet of the present invention will be described. In this pile yarn, the pile single yarn has a coated pile single yarn to which a layer A containing organopolysiloxane and a fluorine-based compound is attached.

Figure 5:
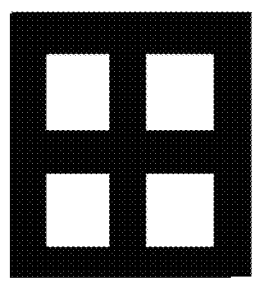
FIG. 5 is an example illustrating a cross-sectional shape of a pile single yarn of the present invention.

The cross-sectional shape of the pile single yarn may be any shape. Examples thereof include a circular cross section, a Y-shaped cross section, a Y-shaped hollow cross section, a triangular cross section, a square cross section, a multi-lobal cross section, a flat cross section, and a cross section as illustrated in FIG. 5. In the case of adopting a Y-shaped cross section, a Y-shaped hollow cross section, and a cross section as illustrated in FIG. 5, the bulkiness is increased as compared to that of a circular cross section and the durability and texture of the carpet itself are improved.

From the viewpoint of the design and texture of the carpet, this pile yarn is preferably subjected to intermingle yarn processing or twisted yarn processing.

The twisted yarn processing may be either single twisting or double twisting. When double twisting is performed, heat setting may be performed in order to enhance the bulkiness of the pile yarn, the heat setting method may be a continuous setting method (a setting method using steam or dry heat in a relaxed state), an autoclave method or the like, and the heat setting temperature is preferably 110° C. to 150° C.

The material constituting this pile single yarn is preferably a thermoplastic resin. Specifically, the material preferably contains one or more selected from the group consisting of a polyester resin, a polyolefin resin, an acrylic resin, and a polyamide resin.

Among these, those containing a polyamide resin are preferable and those composed of a polyamide resin are more preferable as the thermoplastic resin of the material constituting the pile single yarn. Since a polyamide resin is excellent in texture and durability, the carpet of the present invention having a pile single yarn composed of a polyamide resin is far superior in the antifouling durability and the durability and texture of the carpet itself. Examples of the polyamide resin that can be used in the present invention include polycaproamide (nylon 6), polyhexamethylene adipamide (nylon 66), polypentamethylene adipamide (nylon 56), polyundecane amide (nylon 11), polydodecane amide (nylon 12), polyhexamethylene sebacamide (nylon 610), and polypentamethylene sebacamide (nylon 510).

The polyamide resin that is particularly suitably used as a material constituting the pile single yarn may contain one or more selected from the group consisting of, for example, antioxidants, heat resistant stabilizers, weather resistant agents, pigments, gloss improvers, dyes, crystal nucleating agents, plasticizers, antistatic agents, flame retardants and the like. Examples of antioxidants include sulfur-based acids and phosphorus-based acids. Examples of the heat resistant stabilizers include hindered phenol-based compounds, hydroquinone-based compounds, phosphorus-based compounds, imidazole-based compounds, thiazole-based compounds and substitutes thereof, copper halides, and iodine compounds. Examples of weather resistant agents include resorcinol-based, salicylate-based, benzotriazole-based, benzophenone-based, and hindered amine-based weather resistant agents. Examples of pigments include cadmium sulfide, phthalocyanine, and carbon black. Examples of gloss improvers include titanium oxide and calcium carbonate. Examples of dyes include nigrosin and aniline black.

Examples of crystal nucleating agents include talc, silica, kaolin, and clay. Examples of plasticizers include octyl p-oxybenzoate and N-butylbenzenesulfonamide. Examples of antistatic agents include alkyl sulfate type anionic antistatic agents, quaternary ammonium salt type cationic antistatic agents, nonionic antistatic agents such as polyoxyethylene sorbitan monostearate, and betaine-based amphoteric antistatic agents. Examples of flame retardants include melamine cyanurate, hydroxides such as magnesium hydroxide and aluminum hydroxide, ammonium polyphosphate, brominated polystyrene, brominated polyphenylene oxide, brominated polycarbonate, brominated epoxy resin, or combinations of these brominated flame retardants with antimony trioxide.

When the pile single yarn contains a polyamide resin, the pile yarn composed of this pile single yarn naturally also contains a polyamide resin. The content of polyamide resin with respect to the entire pile yarn is preferably 50% to 99% by mass in consideration of texture and wear resistance. A polyamide resin and other materials can be combined to be used in the pile yarn. Examples of materials other than the polyamide resin that can be combined include natural fibers such as cotton, linen, wool, and silk, recycled fibers such as rayon and cupra, semi-synthetic fibers such as acetate, and synthetic fibers such as polyester (polyethylene terephthalate, polybutylene terephthalate, and the like), polyacrylonitol, and polypropylene.

In the present invention, it is preferable that the layer A containing organopolysiloxane and a fluorine-based compound contain a cured resin. As a cured resin is contained in the layer A containing organopolysiloxane and a fluorine-based compound, the dry antifouling durability and the wet antifouling durability of the carpet become superior. The mechanism by which the dry antifouling durability and the wet antifouling durability of the carpet become superior as a cured resin is included in the layer A containing organopolysiloxane and a fluorine-based compound is presumed to be as follows.

By applying an uncured resin that is a precursor of a cured resin to the surface of a pile single yarn together with organopolysiloxane and a fluorine-based compound and performing the crosslinking reaction, it is considered that the organopolysiloxane and the fluorine-based compound are entangled with the cured resin and the adhesion force to the pile single yarn becomes stronger by the chemical reaction accompanying the curing. A larger part of the surface of the pile single yarn can be covered.

In the present invention, as the composition ratio (based on solid components) of the organopolysiloxane, fluorine-based compound, and cured resin contained in the layer A, it is preferable that the fluorine-based compound be 1 to 100 parts by mass and the cured resin be 1 to 100 parts by mass with respect to 10 parts by mass of organopolysiloxane.

Examples of the precursor of the cured resin include curable melamine-based resins and curable urea-based resins. From the viewpoint of texture, melamine-based resins are preferable among these. The melamine-based resin is not particularly limited as long as it is generally used, and specific examples thereof include trimethylolmelamine resin and hexamethylolmelamine resin. In particular, trimethylolmelamine resin having an amino group is preferable from the viewpoint of being able to cover a larger part of the surface of the pile single yarn. In the case of using a cured resin, the concentration of the precursor of the cured resin in the treatment liquid is preferably 2 to 100 g/L with respect to the treatment liquid. By setting the concentration of the precursor to 3 g/L or more, a layer having a uniform thickness can be formed and the antifouling durability of the carpet is improved. Meanwhile, by setting the concentration of the precursor to 50 g/L or less, the pile yarn becomes hard and a decrease in the quality is suppressed. The concentration of the precursor is more preferably 5 to 50 g/L with respect to the treatment liquid.

From the viewpoint of efficiently conducting the crosslinking reaction, it is preferable to add a curing catalyst to the treatment liquid. The curing catalyst is not particularly limited as long as it is generally used, and specific examples thereof include organic amine salt-based, metal salt-based, and composite metal salt-based curing catalysts. In the case of adopting a melamine resin as the cured resin, the curing catalyst is preferably an organic amine salt-based curing catalyst from the viewpoint of obtaining high reaction promoting properties at a low temperature. In the case of using a curing catalyst, the concentration of the curing catalyst is preferably 1 to 100 g/L with respect to the treatment liquid. By setting the concentration of the curing catalyst to 2 g/L or more, the crosslinking reaction can be further promoted. Meanwhile, when the concentration of the curing catalyst exceeds 100 g/L, the reaction decreases. The concentration of the curing catalyst is more preferably 3 to 50 g/L with respect to the treatment liquid.

In the carpet of the present invention, the fineness of the coated pile single yarn is 8 to 40 dtex. In order to further improve the antifouling properties of the carpet against dry soil and wet soil, the fineness of the coated pile single yarn is preferably 10 dtex or more, more preferably 15 dtex or more. By setting the fineness to 40 dtex or less, it is possible to prevent the texture from becoming hard. The fineness is more preferably 35 dtex or less. Examples of a means for setting the fineness of the pile single yarn to be in the above range include increasing the fineness of the pile single yarn to adjust and increasing the thickness of the layer A containing organopolysiloxane and a fluorine-based compound to adjust. As a means for achieving this, it is preferable to adjust the fineness of the pile single yarn for the reason that the adjustment is easily performed and a tendency is observed that the antifouling properties of the carpet against dry soil and wet soil become superior.

In the carpet of the present invention, the crimp elongation of the pile yarn is 10% to 30%. The pile yarn included in the carpet of the present invention exhibits a crimping property, and the crimp elongation is referred to as an occurrence rate of crimping in boiling water. In more detail, the crimp elongation refers to one measured by the method described in the section of the measuring method in Examples. The lower limit of the crimp elongation is preferably 12% or more for the reason that the antifouling properties of the carpet against dry soil and wet soil become superior. Meanwhile, for the same reason as described above, the upper limit of the crimp elongation is preferably 24% or less. Examples of a means for setting the crimp elongation of the pile yarn to be in the above range include using a crimped yarn as the pile single yarn contained in the pile yarn and adjusting the crimp elongation as an aggregate of the pile single yarns contained in the pile yarn. As a means for achieving this, it is preferable to adjust the crimp elongation of the aggregate itself of all the pile single yarns contained in the pile yarn for the reason that the adjustment is easily performed and a tendency is observed that the antifouling properties of the carpet against dry soil and wet soil become superior.

In the carpet of the present invention, the degree of deformation of the coated pile single yarn is preferably 1.1 to 5.0. By setting the degree of deformation of the coated pile single yarn to 1.1 to 5.0, it is possible to further improve the antifouling properties of the carpet against dry soil and wet soil. The degree of deformation is represented by the ratio (D/d) of the diameter D of the circumscribed circle in the cross section of the coated pile single yarn to the diameter d of the inscribed circle in the cross section of the coated pile single yarn. In more detail, the crimp elongation refers to one measured by the method described in the section of the measuring method in Examples.

The basis weight of the layer composed of pile yarns is preferably 400 g/m$^2$ or more before the layer A containing organopolysiloxane and a fluorine-based compound is provided. By setting the basis weight of the layer composed of pile yarns to 400 g/m$^2$ or more, the antifouling properties of the carpet having this pile layer against dry soil and wet soil become excellent. The upper limit of this basis weight is not particularly limited but is preferably 3000 g/m$^2$ or less from the viewpoint of handling the pile layer. The basis weight is more preferably 500 g/m$^2$ or more and 2500 g/m$^2$ or less.

The form of the carpet is a carpet including pile yarns, and examples thereof include woven carpets such as china rug, wilton carpet, double woven carpet, and axminster carpet, embroidered carpets such as tufted carpet and hooked rug, and adhesive carpets such as bonded carpet, electroplated carpet, and cord carpet. From the viewpoint of productivity, it is preferable to form the carpet into tufted carpet.

The tufted carpet is manufactured by inserting pile yarns into the primary base fabric using a tufting machine, flocking the pile yarns, so-called tufting the pile yarns, and sealing the back side for the purpose of preventing the pile yarns from fraying. Depending on the intended use, a secondary base fabric is pasted as lining after the sealing for the purpose of strength improvement and dimensional stability at the time of fabrication and during use. As the primary base fabric, conventionally known ones can be used, and examples thereof include a nonwoven fabric and a long-fiber woven fabric which are formed of a thermoplastic filament such as polyethylene terephthalate and manufactured by a spunbonding method. Examples of the sealing agent used for sealing include styrene-butadiene rubber (SBR)-based, nitrile-butadiene rubber (NBR)-based, and ethylene-vinyl acetate (EVA)-based latexes, polyurethane, and polyvinyl chloride (PVC). Examples of the secondary base fabric to be pasted in the lining are jute fabric and synthetic fiber nonwoven fabrics.

As the form of the pile layer of the carpet, there are a cut form, a loop form, and a cut & loop form. The form of the pile layer of the carpet is preferably a loop form. By adopting a loop form, the antifouling properties of the carpet against dry soil and wet soil are improved.

When the carpet staining degree ΔE is 30 or less in an antifouling dry test based on the antifouling test method for the carpet and the carpet staining degree ΔE is 30 or less in an antifouling wet test, a carpet excellent in the antifouling property against dry soil and excellent in the antifouling property against wet soil is obtained, and the carpet can be particularly suitably used as carpets for outdoor shoes (for example, tile carpets) used in offices and the like that are locations to which dry soil and wet soil easily adhere and which are frequently trampled by outdoor shoes and as carpets for car interior (for example, optional mats).

EXAMPLES

Hereinafter, the present invention will be described in detail based on Examples, but the present invention is not limited thereto. The property in Examples was measured by the following method.

Measuring Method (1) Carpet Staining Degree (ΔE) in Antifouling Dry Test

The carpet staining degree was evaluated in conformity with JIS L 1919 (8.1.2 A-2 method) (2012).

First, the carpet was conditioned for 24 hours in an environment at 20° C. and 65% RH, then ten carpet test pieces having a size of 1.5 cm×1.5 cm were fabricated from this carpet, and the L*, a*, and b* values of the test pieces before staining were measured using a color meter (manufactured by Konica Minolta, Inc., measuring head: CR-300, data processor: DP-300).

Next, Class 11 Kanto Loam of JIS Z 8901 Test Powders 1 (sold by The Association of Powder Process Industry and Engineering, JAPAN) was prepared as a powder contaminant. In a polyethylene zipper bag (length: about 280 mm, width: about 200 mm, thickness: about 0.08 mm), 1 g of this powder contaminant was placed, then one test piece (1.5 cm×1.5 cm) was placed in the polyethylene bag, and air was filled in the polyethylene bag using an air pump until the polyethylene bag was completely inflated. This was placed in the rotating box of the ICI type pilling tester specified in JIS L 1076 (4.1), and the tester was operated at a speed of 60 rpm for 60 minutes. After the operation, the four corners of the test piece were taken, and the central part of the back of the test piece was flicked with a finger five times to remove excess dirt. Thereafter, the L*', a*', and b*' values of the test piece after staining were measured using the color meter.

ΔE was calculated from the obtained L*, a*, and b* values of the test piece before and after staining by the following equation, the average value for the ten pieces was calculated, ΔE (color difference) was taken as the carpet staining degree, and the carpet staining degree (ΔE) in an antifouling dry test was thus determined.

$$\Delta E=[(L^{*\prime}-L^*)^2+(a^{*\prime}-a^*)^2+(b^{*\prime}-b^*)^2]^{1/2}.$$

(2) Carpet Staining Degree (ΔE) in Antifouling Wet Test

The carpet was conditioned for 24 hours in an environment at 20° C. and 65% RH, then ten carpet test pieces having a size of 2 cm×12 cm were fabricated from this carpet, and the L*, a*, and b* values of the test pieces before staining were measured using a color meter (manufactured by Konica Minolta, Inc., measuring head: CR-300, data processor: DP-300).

Next, a commercially available rubber plate having a size of 7 cm×30 cm×thickness of 1.0 mm was prepared. A commercially available spray bottle having a height of 11.5 cm from the bottom to the spray nozzle and a diameter of 30 mm was prepared on the rubber plate and filled with tap water. The spray bottle was tilted 30 degrees on the rubber plate at a place separated by 20 cm from the rubber plate, and tap water was sprayed one time on a total of five locations apart from each other at an interval of 2.5 cm including the edge of the rubber plate one time on each location. Thereafter, 0.005 g of powder contaminant (Class 11 Kanto Loam of JIS Z 8901 Test Powders 1 manufactured by The Association of Powder Process Industry and Engineering, JAPAN, sold by The Association of Powder Process Industry and Engineering, JAPAN) was uniformly sprinkled within 3 cm×16 cm of the center on the rubber plate.

Next, the rubber plate on which tap water and the powder contaminant were placed was set on a flat surface wear tester (manufactured by DAIEI KAGAKU SEIKI MFG, CO., LTD., friction stroke: 140 mm, reciprocating speed: 60 times/minute) without being tilted, and the carpet test piece was set on the terminal (curved surface, R10 mm) of the flat surface wear tester.

Next, the flat surface wear tester was reciprocated ten times with a load of 500 g, and the worn surface of the test piece was pressed against a different location of "Kimtowel" (registered trademark, manufactured by NIPPON PAPER CRECIA CO., LTD., four-layered) for each time in a total of five times while the test piece was attached to the terminal. Thereafter, air drying was performed for 24 hours, and a test piece for the staining degree test was thus obtained.

The worn surface of the test piece was evaluated for the staining degree ($\Delta E$) by the same method as that described in (1), and the carpet staining degree ($\Delta E$) in an antifouling wet test was thus determined.

(3) Fineness of Coated Pile Single Yarn

Fifty pile yarns were randomly cut from the carpet, and five coated pile single yarns were randomly extracted from each of the pile yarns to obtain a total of 250 pile single yarns. Next, the total weight of the 250 coated pile single yarns was measured, further the length of each of the 250 coated pile single yarns was measured, and the sum of the obtained lengths was taken as the total length of 250 coated pile single yarns. Thereafter, the fineness of coated pile single yarn was calculated by the following equation using the total weight and the total length.

$$\text{Fineness of coated pile single yarn (dtex)} = 10000 \times W/L$$

Here, W: total weight of coated pile single yarns (g)

L: total length of coated pile single yarns (m).

(4) Crimp Elongation of Pile Yarn

The pile yarn was withdrawn from the pile layer of the carpet and left in an atmosphere at room temperature of 25° C. and a relative humidity of 65% for 24 hours. Thereafter, the pile yarn was immersed in boiling water for 30 minutes under no load and then dried at room temperature of 25° C. and a relative humidity of 65% for 24 hours, and this was used as a measurement sample of the crimp elongation. An initial load of 2 mg/dtex was applied to this sample in an atmosphere of room temperature of 25° C. and a relative humidity of 65%, and the sample length (L1) was measured after 30 seconds had elapsed. Next, the initial load was removed, then a constant load of 100 mg/dtex was applied to the sample, and the extended sample length (L2) was measured after 30 seconds had elapsed. Then, the crimp elongation of pile yarn (%) was determined by the following equation.

$$\text{Crimp elongation of pile yarn (\%)} = [(L2-L1)/L1] \times 100.$$

(5) Degree of Deformation of Coated Pile Single Yarn

The pile yarn was withdrawn from the pile layer of the carpet, the pile yarn end was wrapped with a rayon staple, and the pile yarn was allowed to pass through a hole (hole diameter: 1.0 mm) provided in a stainless steel preparation with a thickness of 0.5 mm and cut in parallel along both sides of the preparation using a safety razor to be used as a sample for cross-section observation. This sample was observed at a magnification of 500-fold under a digital microscope "VHX-500" manufactured by KEYENCE CORPORATION, and the degree of deformation was calculated by the following equation from the diameter D of the circumscribed circle in the cross section of the coated pile single yarn and the diameter d of the inscribed circle in the cross section of the coated pile single yarn. The degree of deformation was calculated from the average value of ten samples.

$$\text{Degree of deformation} = D/d.$$

(6) Basis Weight of Pile Layer

The primary base fabric before tufting was cut into 50 cm squares, and the mass of the primary base fabric was measured. Subsequently, the carpet layer after tufting (tufted gray fabric) was cut into 50 cm squares, and the weight of the carpet layer was measured. The weight of the primary base fabric was subtracted from the weight of the carpet layer to obtain the weight of the pile yarn in the sample. The weight of the pile yarn converted per unit area (1 m$^2$) was taken as the basis weight (g/m$^2$) of the pile layer.

(7) Durability of Carpet

A load was applied to the carpet at the number of rotations of 5000 of the circular sample table based on JIS L 1021-11 (2007) 7, and the durability of the carpet itself was judged in conformity with JIS L 1021-13 (2007).

(8) Evaluation on Quality of Carpet

The quality of carpet was evaluated by ten subjects according to the following criteria using the obtained carpet.

<Individual Evaluation Criteria>

3 points: The texture by hand touch is extremely excellent.

2 points: The texture by hand touch is excellent.

1 point: The texture by hand touch is poor.

<Total Evaluation Criteria>

A: 25 to 30 points

B: 17 to 24 points

C: 10 to 16 points (9) Surface Composition Analysis of Coated Pile Single Yarn

It can be confirmed that the coating layer of the coated pile single yarn of the carpet contains organopolysiloxane and a fluorine-based compound by performing detection using a time-of-flight secondary ion mass spectrometry (: TOF-SIMS) instrument (manufactured by ULVAC-PHI, INC.) As the measuring instrument, a metal ion gun equipped with a Bi ion beam is used.

(10) Attachment Area Ratio in Coated Pile Single Yarn

Metal deposition was performed on the surface of the carpet on the side having the pile yarn using a metal deposition instrument (trade name: JEC-3000FC Auto Fine Coater) manufactured by JEOL Ltd. to obtain a sample for observation. Next, the sample was mounted on an ultra-high resolution field emission scanning electron microscope (trade name: SU8010) manufactured by Hitachi, Ltd., the surface of the sample on the side subjected to metal deposition was observed at a magnification of 35,000-fold, and surface SEM images were taken for each of five randomly selected coated pile single yarns. Next, each of the five obtained surface SEM images was processed using image processing software (software name: WinROOF developed by MITANI CORPORATION), the ratios of the entire areas of the surfaces of the covered pile single yarns to the total areas of the visual fields of the SEM images were measured, and the average value thereof was taken as the attachment area ratio in the coated pile single yarn. For the measurement of coated area, the automatic binarization (threshold value determination method: discriminant analysis method, light-darkness of extracted region: bright region, target density range: 0 to 255) of the image processing software was used. However, in a case in which it is difficult to determine the threshold value based on the automatic binarization, the measurement can be performed by setting the motion to flat motion.

Example 1

(Fabrication of Carpet)

Two nylon 6 multifilament crimped yarns (cross-sectional shape illustrated in FIG. 5) of 970 dtex-54f (single yarn fineness: 18.0 dtex, crimp elongation: 18%) were combined and entangled using an intermingle machine to obtain an intermingle-processed yarn.

Next, the intermingle-processed yarn was placed on a polyester spunbond primary base fabric with a basis weight of 100 g/m² and tufted to fabricate a carpet layer (tufted gray fabric) having a level loop with a basis weight of 700 g/m². The basis weight of the pile layer included in the carpet layer (tufted gray fabric) was 600 g/m².

Next, the carpet layer (tufted gray fabric) was dyed white with an acid dye using a wins dyeing machine.

(Prescription of Treatment Liquid 1)

The treatment liquid 1 was prescribed as follows.
Solvent: Water
Aqueous dispersion of cation-modified organosilicate fine particles (solid content: 20%, average particle size: 30 nm): 60 g/L
Aqueous dispersion of compound that is nonionic, contains C6 perfluoroalkyl group, and has siloxane bond (solid content: 30%): 10 g/L (Fixing of Treatment Liquid 1)

The obtained carpet layer (tufted gray fabric) was immersed in the prescribed treatment liquid 1, squeezed using a mangle, and then dried at 130° C. using a heat setter to fix the layer A containing organopolysiloxane and a fluorine-based compound to the pile single yarn included in the carpet layer.

(Back Pasting)

Acrylic resin was applied to the side (back side) opposite to the side that was subjected to the fixing of the layer A containing organopolysiloxane and a fluorine-based compound and the side having the pile layer of the carpet layer (tufted gray fabric) so as to have a basis weight of 180 g/m² (when dried) and dried at 130° C. Next, a polyester nonwoven fabric (lining layer) having a basis weight of 300 g/m² was pasted to the back surface of the carpet layer to obtain a carpet. The composition and properties of this carpet are presented in Table 1.

Example 2

A carpet was obtained in the same manner as in Example 1 except that the nylon 6 multifilament crimped yarn of 970 dtex-54f (single yarn fineness: 18.0 dtex, crimp elongation: 18%) used in Example 1 was changed to a nylon 6 multifilament crimped yarn of 980 dtex-118f (single yarn fineness: 8.3 dtex, crimp elongation: 18%). The composition and properties of this carpet are presented in Table 1.

Example 3

A carpet was obtained in the same manner as in Example 1 except that the treatment liquid 1 was changed to a treatment liquid 2 described below. The composition and properties of this carpet are presented in Table 1.

(Prescription of Treatment Liquid 2)

The treatment liquid 2 was prescribed as follows.
Solvent: Water
Aqueous dispersion of cation-modified organosilicate fine particles (solid content: 20%, average particle size: 30 nm): 60 g/L
Aqueous dispersion of compound that is nonionic, contains C6 perfluoroalkyl group, and has siloxane bond (solid content: 30%): 10 g/L
Aqueous dispersion of trimethylolamine melamine resin (solid content: 80%): 10 g/L
Aqueous dispersion of organic amine salt (solid content: 40%): 5 g/L Example 4

A carpet was obtained in the same manner as in Example 1 except that the nylon 6 multifilament crimped yarn (cross-sectional shape: grid-shape, degree of deformation: 1.2) used in Example 1 was changed to a nylon 6 multifilament crimped yarn (cross-sectional shape: trilobal Y-shape, degree of deformation: 5.5). The composition and properties of the obtained carpet are presented in Table 1.

Example 5

A carpet was obtained in the same manner as in Example 1 except that the nylon 6 multifilament crimped yarn of 970 dtex-54f (single yarn fineness: 18.0 dtex, crimp elongation: 18%) used in Example 1 was changed to a nylon 6 multifilament crimped yarn of 1280 dtex-54f (single yarn fineness: 23.7 dtex, crimp elongation: 22%, black spun-dyed, cross-sectional shape: trilobal Y-shape, degree of deformation: 3.0) and the basis weight of the carpet layer after tufting was changed to 1700 g/m². The composition and properties of the obtained carpet are presented in Table 1.

Example 6

A carpet was obtained in the same manner as in Example 1 except that the treatment liquid 1 was changed to a treatment liquid 3 described below. The composition and properties of this carpet are presented in Table 1.

(Prescription of Treatment Liquid 3)

The treatment liquid 3 was prescribed as follows.
Solvent: Water
Aqueous dispersion of cation-modified organosilicate fine particles (solid content: 20%, average particle size: 30 nm): 60 g/L
Aqueous dispersion of compound that is cationic and contains C6 perfluoroalkyl group (solid content: 30%): 10 g/L Example 7

A carpet was obtained in the same manner as in Example 1 except that the treatment liquid 1 was changed to a treatment liquid 4 described below. The composition and properties of this carpet are presented in Table 1.

(Prescription of Treatment Liquid 4)

The treatment liquid 4 was prescribed as follows.
Solvent: Water
Aqueous dispersion of cation-modified organosilicate fine particles (solid content: 20%, average particle size: 30 nm): 60 g/L
Aqueous dispersion of compound that is anionic and contains C6 perfluoroalkyl group (solid content: 30%): 10 g/L

Example 8

A carpet was obtained in the same manner as in Example 1 except that the treatment liquid 1 was changed to a treatment liquid 5 described below. The composition and properties of this carpet are presented in Table 1.
(Prescription of Treatment Liquid 5)
The treatment liquid 5 was prescribed as follows.
Solvent: Water
Aqueous dispersion of cation-modified organosilicate fine particles (solid content: 20%, average particle size: 30 nm): 60 g/L
Aqueous dispersion of compound that is amphoteric ion and contains C6 perfluoroalkyl group (solid content: 30%): 10 g/L

Comparative Example 1

A carpet was obtained in the same manner as in Example 1 except that the treatment of applying the treatment liquid 1 to the pile single yarn of the carpet layer was not performed. The composition and property of the obtained carpet are presented in Table 2.

Comparative Example 2

A carpet was obtained in the same manner as in Example 1 except that the nylon 6 multifilament crimped yarn of 970 dtex-54f (single yarn fineness: 18.0 dtex, crimp elongation: 18%) used in Example 1 was changed to a nylon 6 multifilament crimped yarn of 1000 dtex-360f (single yarn fineness: 2.8 dtex, crimp elongation: 18%). The composition and property of the obtained carpet are presented in Table 2.

Comparative Example 3

A carpet was obtained in the same manner as in Example 1 except that the nylon 6 multifilament crimped yarn of 970 dtex-54f (single yarn fineness: 18.0 dtex, crimp elongation: 18%) used in Example 1 was changed to a nylon 6 multifilament crimped yarn of 970 dtex-54f (single yarn fineness: 18 dtex, crimp elongation: 5%). The composition and property of the obtained carpet are presented in Table 2.

Comparative Example 4

A carpet was obtained in the same manner as in Example 1 except that the nylon 6 multifilament crimped yarn of 970 dtex-54f (single yarn fineness: 18.0 dtex, crimp elongation: 18%) used in Example 1 was changed to a nylon 6 multifilament crimped yarn of 970 dtex-54f (single yarn fineness: 18 dtex, crimp elongation: 35%). The composition and property of the obtained carpet are presented in Table 2.

TABLE 1

| | | Unit | Example 1 | Example 2 | Example 3 | Example 4 | Example 5 | Example 6 | Example 7 | Example 8 |
|---|---|---|---|---|---|---|---|---|---|---|
| Pile yarn | Pile single yarn | — | Nylon 6 | Nylon 6 | Nylon 6 | Nylon 6 | Nylon 6 | Nylon 6 | Nylon 6 | Nylon 6 |
| | Total fineness | dtex | 990 | 1000 | 1000 | 990 | 1300 | 990 | 990 | 990 |
| | Number of filaments | — | 54 | 118 | 54 | 54 | 54 | 54 | 54 | 54 |
| | Fineness of coated pile single yarn | dtex | 18 | 9 | 19 | 18 | 24 | 18 | 18 | 18 |
| | Crimp elongation | % | 19 | 17 | 21 | 19 | 23 | 19 | 19 | 19 |
| | Components of coating layer — Organopolysiloxane | — | Material A | Material A | Material A | Material A | Material A | Material A | Material A | Material A |
| | Components of coating layer — Fluorine-based compound | — | Material B | Material B | Material B | Material B | Material B | Material B | Material B | Material B |
| | Ionicity of fluorine compound | — | Nonion | Nonion | Nonion | Nonion | Nonion | Cation | Anion | Amphoteric |
| | Others | — | None | Nene | Melamine | None | None | None | None | None |
| | Degree of deformation of coated pile single yarn | — | 1.4 | 1.4 | 1.4 | 5.5 | 3.0 | 1.4 | 1.4 | 1.4 |
| Pile Carpet | Basis weight | g/m$^2$ | 600 | 600 | 600 | 600 | 1700 | 600 | 600 | 600 |
| | Carpet color before antifouling test | | White | White | White | White | Black | White | White | White |
| | ΔE in antifouling dry test | — | 11.5 | 17.0 | 9.8 | 21.0 | 2.5 | 23.0 | 22.0 | 21.5 |
| | ΔE in antifouling wet test | — | 9.0 | 15.0 | 8.0 | 18.0 | 1.8 | 27.0 | 25.0 | 28.0 |
| | Durability | Grade | 4 | 4 | 4 | 4 | 4 | 4 | 4 | 4 |
| | Quality | — | A | A | A | A | A | A | A | A |

Material A: Cation-modified organosilicate
Material B: Compound having C6 perfluoroalkyl group

TABLE 2

| | | Unit | Comparative Example 1 | Comparative Example 2 | Comparative Example 3 | Comparative Example 4 |
|---|---|---|---|---|---|---|
| Pile yarn | Pile single yarn | — | Nylon 6 | Nylon 6 | Nylon 6 | Nylon 6 |
| | Total fineness | dtex | 980 | 1030 | 990 | 990 |
| | Fineness of coated pile single yarn | — | 54 | 360 | 54 | 54 |
| | Fineness of coated pile single yarn | dtex | 18 | 3 | 18 | 18 |
| | Crimp elongation | % | 18 | 19 | 6 | 37 |
| | Components of coating layer — Organopolysiloxane | — | None | Material A | Material A | Material A |
| | Ionicity of fluorine compound | — | None | Material B | Material B | Material B |
| | Ionicity of fluorine compound | — | None | Nonion | Nonion | Nonion |

TABLE 2-continued

|  |  | Unit | Comparative Example 1 | Comparative Example 2 | Comparative Example 3 | Comparative Example 4 |
|---|---|---|---|---|---|---|
|  | Others | — | None | None | None | None |
|  | Degree of deformation of coated pile single yarn | — | 1.4 | 1.4 | 1.4 | 1.4 |
| Pile layer | Basis weight | g/m² | 600 | 600 | 600 | 600 |
| Carpet | Carpet color before antifouling test |  | White | White | White | White |
|  | ΔE in antifouling dry test | — | 48.0 | 34.0 | 25.0 | 32.0 |
|  | ΔE in antifouling wet test | — | 44.0 | 37.0 | 32.0 | 34.0 |
|  | Durability | Grade | 4 | 3 | 3 | 4 |
|  | Quality | — | A | A | A | B |

Material A: Cation-modified organosilicate
Material B: Compound having C6 perfluoroalkyl group

INDUSTRIAL APPLICABILITY

The intended use of the carpet of the present invention is residential use, commercial use, automobile use and the like and is not particularly limited. The carpet of the present invention is particularly suitable to be used as carpets for outdoor shoes such as tile carpets and carpets for car interior such as optional mats which are frequently trampled by outdoor shoes and required to exhibit long-term durability and wear resistance.

DESCRIPTION OF REFERENCE SIGNS

1: Carpet
2: Carpet layer
3: Lining layer
4: Pile yarn
5: Primary base fabric
6: Coated pile single yarn
7: Layer A containing organopolysiloxane and fluorine-based compound
8: Pile single yarn
9: Layer A containing organopolysiloxane and fluorine-based compound
10: Surface of pile single yarn

The invention claimed is:

1. A carpet comprising a pile yarn having a coated pile single yarn, wherein
the coated pile single yarn is a pile single polyamide yarn on which is coated a layer A containing an organopolysiloxane that contains
a cation-modified organosilicate,
a fluorine-based compound that contains a perfluoroalkyl group having 1 to 6 carbon atoms, is nonionic and has a siloxane bond, and
a cured melamine resin, wherein the fluorine-based compound and curded resin are each 1 to 100 parts by mass with respect to 10 parts by mass of the orgaopolysiloxane,
wherein the coated pile single yarn has
a fineness of 8 to 40 dtex,
wherein the pile yarn has
a crimp elongation of 10% to 30%, and
wherein the carpet has
a carpet staining degree (ΔE) in an antifouling dry test of 21 or less, and
a carpet staining degree (ΔE) in an antifouling wet test of 30 or less.

2. The carpet according to claim 1, wherein a degree of deformation of the coated pile single yarn is 1.1 to 5.0.

3. The carpet according to claim 1, the carpet staining degree (ΔE) in an antifouling dry test is 10 or less.

4. The carpet according to claim 1, the carpet staining degree (ΔE) in an antifouling wet test is 15 or less.

5. A method for manufacturing the carpet according to claim 1, the method comprising:
a first step of obtaining a carpet layer including a pile yarn having a pile single polyamide yarn and a primary base fabric;
a second step of impregnating the carpet layer with a precursor solution containing a cation-modified organosilicate, a non-ionic fluorine-based compound that has a perfluoroalkyl group having 1 to 6 carbon atoms and has a siloxane bond, and an uncured resin that is a precursor of a cured melamine resin; and
a final step of curing the precursor solution to form a layer A on the carpet layer.

* * * * *